United States Patent [19]
Sugimori et al.

[11] Patent Number: 5,161,020
[45] Date of Patent: Nov. 3, 1992

[54] TELEVISION BROADCASTING APPARATUS INCLUDING MONOCHROMATIC CHARACTERS WITH A COLORED CONTOUR

[75] Inventors: Yoshio Sugimori; Susumu Takayama; Tadao Kurosaki, all of Tokyo, Japan

[73] Assignee: Nippon Television Network Corporation, Tokyo, Japan

[21] Appl. No.: 645,528

[22] Filed: Jan. 24, 1991

[30] Foreign Application Priority Data

Jan. 30, 1990 [JP] Japan .................................. 2-20335

[51] Int. Cl.$^5$ .......................... H04N 9/68; H04N 5/272
[52] U.S. Cl. ................................... 358/183; 358/21 R
[58] Field of Search .................. 358/21 R, 36, 183, 21, 358/147

[56] References Cited

U.S. PATENT DOCUMENTS

| | | | |
|---|---|---|---|
| 4,558,353 | 10/1985 | Hirota | 358/36 |
| 4,618,882 | 10/1986 | Harwood et al. | 358/36 |
| 5,023,721 | 6/1991 | Moon-Hwan | 358/183 |
| 5,032,916 | 7/1991 | Matsuura et al. | 358/36 |

OTHER PUBLICATIONS

T. Fukinuki, "Multi-Dimensional TV Signal Processing", pp. 174–176, published on Nov. 15, 1988 by Nikkan Kogyo Shimbun.
"Television, Image Engineering Handbook", p. 986 published on Dec. 30, 1980 by Ohm Co., Ltd.

Primary Examiner—Edward L. Coles, Sr.
Assistant Examiner—Kim Yen Vu
Attorney, Agent, or Firm—Sughrue, Mion, Zinn, Macpeak and Seas

[57] ABSTRACT

An apparatus for transmitting an NTSC color signal superposed with a signal corresponding to monochromatic characters with a colored contour, which is obtained from a color character super device, comprises a first circuit responsive the NTSC signal from the color character super device to determine an area on a television receiver screen on which signal out of NTSC signal standard may be displayed, a second circuit for deriving chrominance signal spectrum out of NTSC standard and means for gating the chrominance signal spectrum with an output of the first circuit and then for subtracting the gated chrominance signal spectrum from the NTSC signal to thereby at least reduce signal component thereof out of the NTSC standard signal.

8 Claims, 4 Drawing Sheets 5,161,020

TELEVISION BROADCASTING APPARATUS INCLUDING MONOCHROMATIC CHARACTERS WITH A COLORED CONTOUR

BACKGROUND OF THE INVENTION

The present invention relates to a television signal transmitting apparatus and, particularly, such apparatus capable of minimizing "dot crawl or cross-luminance phenomena" occurring in a boundary portion of a monochromatic character bearing, colored contour on a television receiver screen when the latter receives an NTSC television signal superposed with such monochromatic character with such colored contour by means of the so-called color-super imposing device.

The superposition of monochromatic characters with colored background on an NTSC color signal, referred to as "color letter super system", has been achieved by a circuit shown in FIG. 5. In FIG. 5, an original NTSC signal is input to a terminal 1 and a character signal from a monochrome caption camera or the like is input to a terminal 2. The character signal is passed through a slice circuit 3 to a contour signal generating portion 4 in which a contour signal is generated by expanding horizontal and vertical widths of the sliced character signal. The contour signal thus obtained is passed through a slice circuit 5 to obtain a key signal corresponding to a coloring area of the character and the key signal is supplied to one input of a gate circuit 7.

A 3.58 MHz color sub-carrier from a color sub-carrier oscillator 6 is supplied to an adder 8 set up. An output of the adder 8 is supplied to another input of the gate circuit 7. Thus, the key signal is gated with the output of the adder 8 and the coloring area is defined. The coloring area thus defined is supplied to an input of another gate circuit 9.

The gate circuit 9 has a second input to which the gated character signal from the slice circuit 3 is supplied and a third input connected to the terminal 1. The coloring area is set on the NTSC signal and the character signal is superposed in the coloring area in the gate circuit 9. A resultant signal is output at a terminal 10 of the gate circuit 9.

When monochromatic characters are to be superposed on a colored area by means of this color super imposing device, the 3.58 MHz signal is sharply cut-off in a boundary portion of the colored area, so that a frequency band width of the color signal in the boundary portion exceeds a range defined according to NTSC system.

Further, when the characters superposed by this circuit construction is received by a usual television receiver, a luminance/chrominance signal separation circuit of the receiver can not operate normally due to such wide frequency band width, resulting in that the 3.58 MHz signal in the boundary portion is mixed up to the luminance signal causing flicker effect, referred to as "dot crawl phenomenon", to be produced.

In order to remove such flicker effect, a motion adaptive three-dimensional luminance/chrominance signal separation circuit is provided in an EDTV receiver. When there is such 3.58 MHz signal mixed in the luminance signal, the three-dimensional luminance/chrominance signal separation circuit determines that luminance signal as "moving signal" and switches its construction to a two-dimensional luminance/chrominance signal separation circuit. Although this scheme is effective to remove "cross color" signal component, an image quality itself is degraded due to the fact that the three-dimensional circuit is inoperative.

SUMMARY OF THE INVENTION

An object of the present invention is, therefore, to provide a television broadcasting apparatus capable of transmitting an NTSC television signal superposed with a monochromatic characters with a colored contour, with signal component corresponding to a boundary portion of the colored background area being minimized by deriving and correcting a chrominance signal mixed in a luminance signal.

In order to achieve the above object, according to the present invention, an apparatus for transmitting an NTSC color signal superposed with a signal corresponding to monochromatic characters on a colored contour, which is obtained from a color super character device, comprises a first circuit responsive the NTSC signal from the color super character device to determine an area on a television receiver screen on which signal out of NTSC signal standard may be displayed, a second circuit for deriving chrominance signal spectrum out of NTSC standard and means for gating the chrominance signal spectrum with an output of the first circuit and then for subtracting the gated chrominance signal spectrum from the NTSC signal to thereby at least reduce signal component thereof out of the NTSC standard signal.

DETAILED DESCRIPTION OF THE PREFERRED EMBODIMENTS

Figure 1:
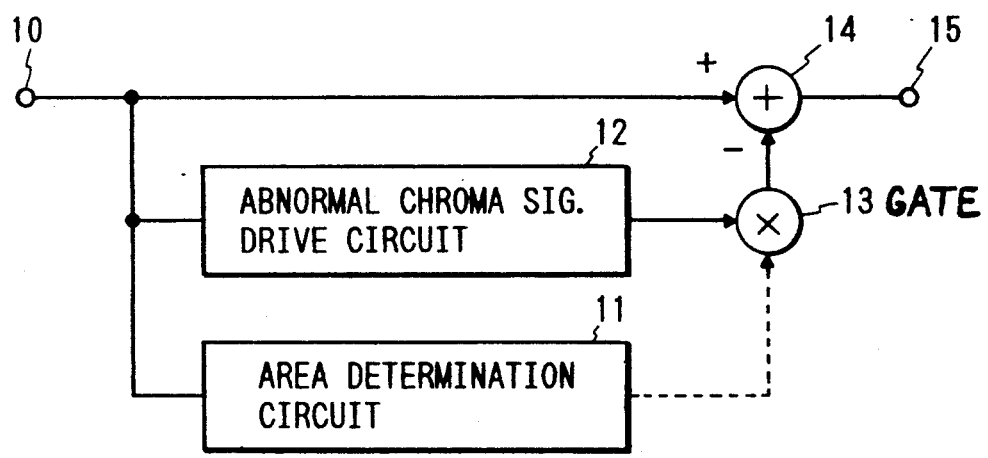
FIG. 1 is a schematic block circuit diagram of an embodiment of the present invention.

Referring to FIG. 1 which shows an embodiment of the present invention schematically, it comprises an area determination circuit 11 having an input connected to an input terminal 10 to which a NTSC signal including a signal corresponding to monochromatic characters with a colored contour is supplied from a conventional color super device, an abnormal chrominance signal spectrum deriving circuit 12 having an input connected to the input terminal 10, a gate circuit 13, a subtractor circuit 14 having an output connected to an output terminal 15.

The gate circuit 13 has an input connected to an output of the abnormal chrominance signal spectrum deriving circuit 12, another input selectively connectable to an output of the area determination circuit 11 and an output connected to a negative input of the subtractor circuit 15. The subtractor circuit 14 has a positive input connected to the input terminal 10.

The area determination circuit 11 serves to determine an area of a television receiver screen on which signal which is out of the NTSC standard signal may be displayed and the circuit 12 serves to derive a chrominance signal spectrum which is out of the NTSC standard.

The abnormal chrominance signal spectrum in the NTSC signal at the input terminal 10 is derived by the circuit 12 and supplied to the gate circuit 13. A signal component displayed in a character area on the screen, which is out of the NTSC standard signal, is derived by the circuit 11 and supplied to the gate circuit 13. The gate circuit 13 allows the output of the circuit 12 to pass to the subtractor circuit 14 only when the output of the circuit 11 exists. In the subtractor circuit 14, the output of the circuit 12 is subtracted from the NTSC signal to remove the out-of-standard signal from the NTSC signal. Thus, an output signal of the subtractor circuit 14 at the output terminal 15 does include only the NTSC signal.

Figure 2:
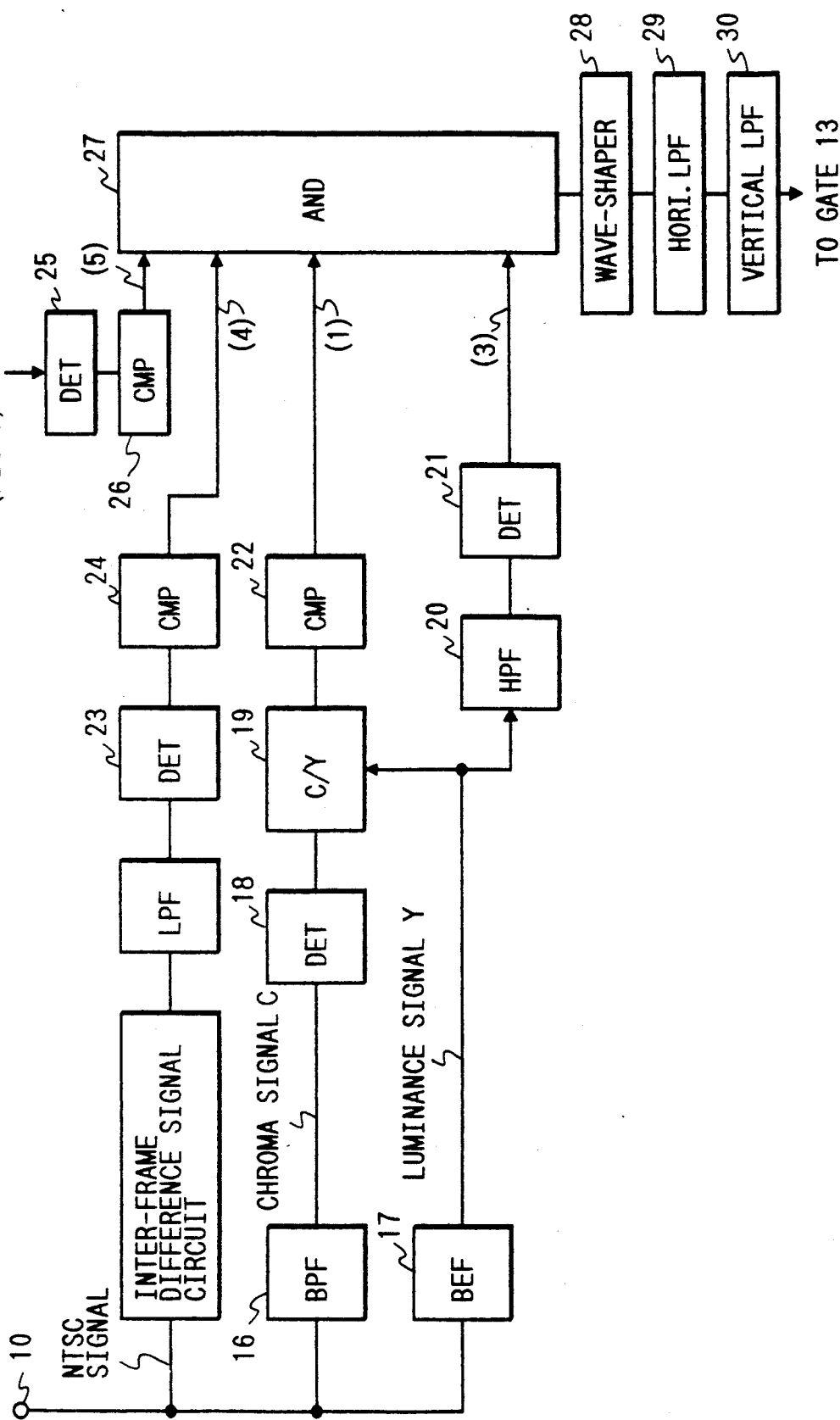
FIG. 2 is a block circuit diagram showing a detailed construction of a region determination circuit shown in FIG. 1.

FIG. 2 is a block circuit diagram showing a detailed construction of the area determination circuit 11 shown in FIG. 1. In FIG. 2, a band-pass filter (BPF) 16 has an input connected to the input terminal 10. An output of the BPF 16 is connected to an input of a detector circuit (DET) 18 whose output is connected to an input of a signal processing circuit 19. An output of the latter is connected to a signal compare circuit (CMP) 22 having an output connected to an AND gate 27.

An input of a band-elimination filter (BEF) 17 is connected to the input terminal 10. An output of the band-elimination filter 17 is connected to another input of the signal processing circuit (C/Y) 19 and to an input of a high-pass filter (HPF) 20 whose output is connected to an input of a detector 21 having an output connected to the AND gate circuit 27.

A frame difference circuit for obtaining a difference in signal between frames is connected to the input terminal 10 and an output thereof is filtered by a low-pass filter (LPF). An output of the low-pass filter is supplied to a detector (DET) 23 whose output is compared by a signal compare circuit (CMP) 24 whose output is also supplied to the AND gate 27.

A signal from an output terminal of the abnormal signal spectrum deriving circuit 12 (detailed construction shown in FIG. 3) is supplied to a detector (DET) 25 and after compared by a compare circuit (CMP) 26 supplied to the AND gate 27.

An output of the AND gate 27 is wave-shaped by a wave-shaper 28 and, after passed through a horizontal low-pass filter 29 and then a vertical low-pass filter 30, supplied to the gate circuit 13 (FIG. 1).

It should be noted that, among the input signals to the AND gate 27, the output signal (1) of the compare circuit 22 is one whose chroma component is abnormally high, the signal (3) from the detector 21 is one which includes detail components such as character whose frequency is higher than an intermediate frequency, the signal (4) from the compare circuit 24, is one corresponding to static condition and the signal (5) from the compare circuit 26 is one containing spectral components expanded in color signal.

Therefore, the output signal of the AND gate 27 indicates an area in which abnormal signal out of the NTSC standard signal exists. This output signal is corrected by gating the aforementioned signal with this. That is, the output signal of the AND gate 27 is expanded horizontally and vertically by the wave-shaper 28 and then smoothed by the low-pass filters 29 and 30. The smoothed signal is supplied to the gate circuit 13.

Figure 3:
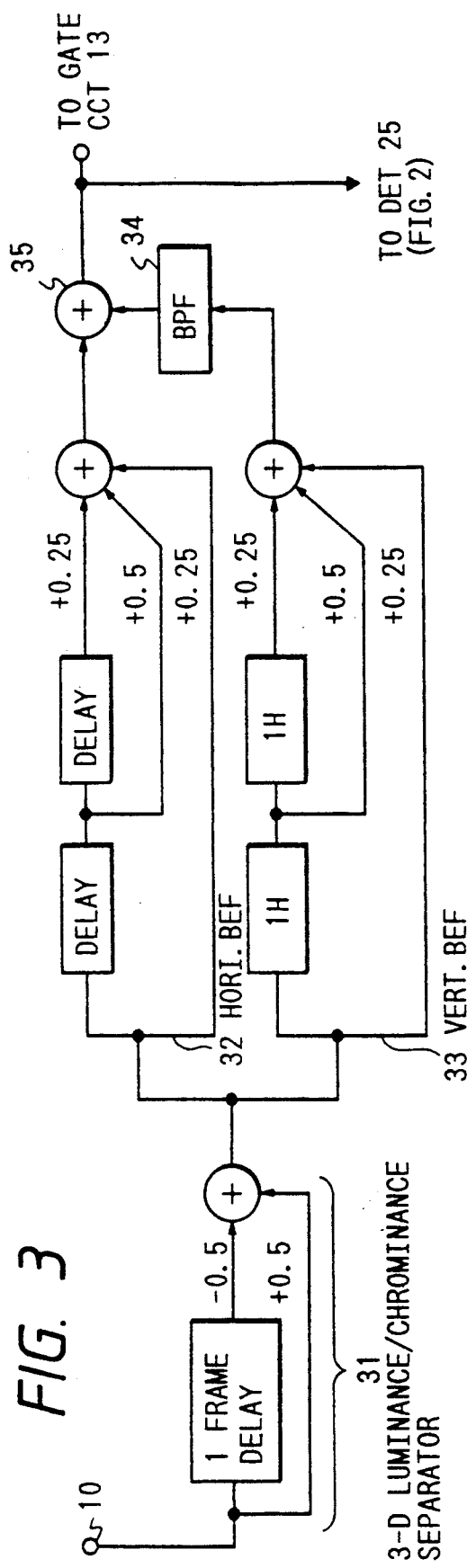
FIG. 3 is a block circuit diagram showing a detailed construction of an abnormal color signal spectrum deriving circuit shown in FIG. 1.

FIG. 3 is a block circuit diagram showing the abnormal color signal spectrum deriving circuit 12 shown in FIG. 1. In FIG. 3, the circuit 12 is composed of a three-dimensional luminance/chrominance signal separation circuit 31, a horizontal band-elimination filter 32, a vertical band-elimination filter 33, a band-pass filter 34 and an adder 35.

Figure 4:
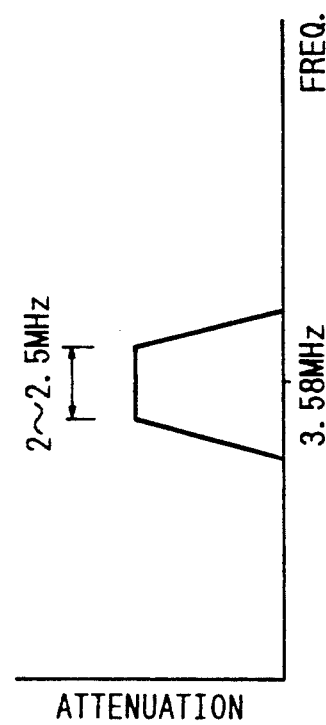
FIG. 4 is a graph showing a frequency characteristics of a filter shown in FIG. 3.
Figure 5:
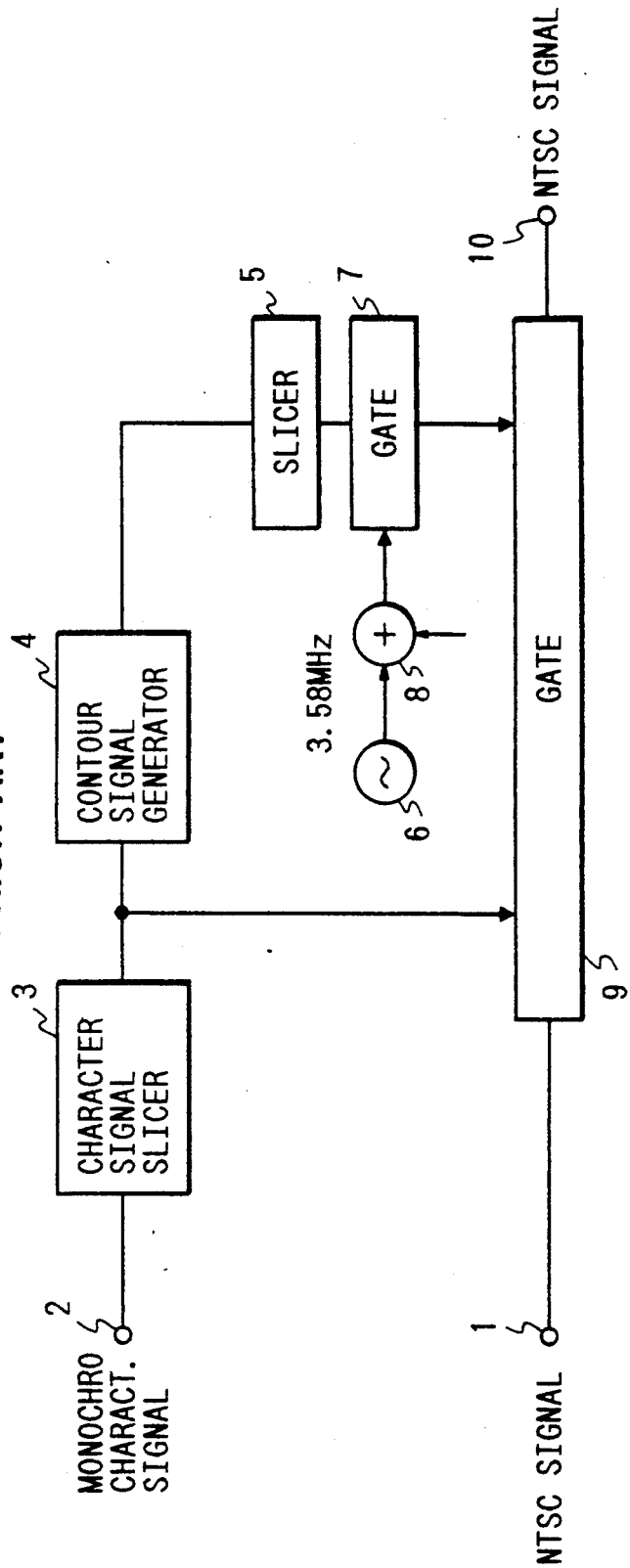
FIG. 5 illustrates an insertion of characters and its colored background by means of a color super means.

The three-dimensional luminance/chrominance signal separation circuit 31 includes a one-frame delay circuit and an adder provides an output signal which contains a chrominance signal and a difference of luminance signal between frames when there is any movement. This output signal of the three-dimensional luminance/chrominance signal separation circuit 31 is passed through a horizontal band-elimination filter 32 composed of a pair of series connected delay circuits and an adder, to obtain component whose frequency exceeds a required horizontal band centered at 3.58 MHz. FIG. 4 shows the characteristics of this horizontal band-elimination filter 32. Similarly, a vertical component whose frequency exceeds a required band is obtained by the vertical band-elimination filter 33 composed of a pair of series connected 1 H delay circuits and an adder. The output of the vertical band-elimination filter 33 is filtered by the band-pass filter 34 and then added to the output of the horizontal band-elimination filter 32 by the adder 35.

As is clear for those skilled in the art, the signal obtained by the circuit shown in FIG. 3 is controlled in the gate circuit 13 in FIG. 1 with the signal obtained by the circuit shown in FIG. 2 and then subtracted from the NTSC signal by the subtractor circuit 14 shown in FIG. 1.

Thus, the flicker effect to be found in the boundary portion of the colored area when a television receiver receives monochromatic characters with a colored contour superposed on the original NTSC signal by the color super means is minimized, resulting in considerably improved image quality on the screen of, in particular, an EDTV receiver. Since the described signal processing is performed in the signal transmitting side, there is no need of providing any means in the receiver side.

What is claimed is:

1. A color television signal transmitting apparatus for transmitting a composite signal provided by a color super device and including an NTSC color signal and a signal corresponding to a title including monochromatic characters on a colored contour, comprising:
    a first circuit (11) responsive to said composite signal for determining an area of a television receiver display screen on which an output signal distinct from the NTSC signal standard is to be displayed;
    a second circuit (12) for deriving a chrominance signal spectrum out of the NTSC signal standard;
    means (13) for gating said chrominance signal spectrum with an output of said first circuit; and
    means (14) for subtracting the gated chrominance signal spectrum from said composite signal to reduce dot crawl signal components of the NTSC signal standard.

2. The apparatus claimed in claim 1, wherein said first circuit comprises first means for deriving abnormally high chroma signals from the composite signal, second means for deriving, from the composite signal, a signal component containing detail components having frequencies higher than an intermediate frequency, third means for deriving, from the composite signal, a signal component corresponding to a static condition, fourth means for deriving, from the composite signal, a signal containing expanded spectral components in the chroma signal, and fifth means responsive to said first to fourth means for providing a signal indicative of a region in which abnormal signals distinct from the NTSC signal standard exist.

3. The apparatus claimed in claims 1 or 2, wherein said second circuit comprises a three-dimensional luminance/chrominance signal separation circuit, a horizontal band-elimination filter connected in series with said three-dimensional luminance/chrominance signal separation circuit, a vertical band-elimination filter connected in parallel with said horizontal band-elimination filter, and sixth means for adding outputs of said horizontal and said vertical band-elimination filters.

4. The apparatus claimed in claim 3, wherein said first means includes a series connection of a band-pass filter for obtaining a chrominance signal, a detector, a signal processing circuit, and a signal comparing circuit.

5. The apparatus claimed in claim 4, wherein said second means includes a series connection of a band-elimination filter for obtaining a luminance signal, a high-pass filter, and a detector, an output of said band-elimination filter being connected to said signal processing circuit.

6. The apparatus claimed in claim 3, wherein said third means includes a series connection of a circuit for obtaining a difference in signal between frames, a low-pass filter, a detector, and a comparator circuit.

7. The apparatus claimed in claim 3, wherein said fourth means includes a detector having an input connected to an output of said sixth means, and a comparator circuit connected in series with said detector.

8. The apparatus claimed in claim 3, wherein said fifth means includes an AND gate receiving outputs of said first to said fourth means, a wave-shaper for shaping an output of said AND gate, and horizontal and vertical low-pass filter means.

* * * * *